United States Patent [19]

Hayashi et al.

[11] Patent Number: 4,524,045
[45] Date of Patent: Jun. 18, 1985

[54] METHOD OF FABRICATING BOTTLE-SHAPED CONTAINER OF SATURATED POLYESTER

[75] Inventors: Yoshiaki Hayashi; Kouichi Haraguchi; Yukio Koshidaka, all of Matsudo, Japan

[73] Assignee: Yoshino Kogyosho Co., Ltd., Tokyo, Japan

[21] Appl. No.: 525,804

[22] Filed: Aug. 24, 1983

Related U.S. Application Data

[63] Continuation of Ser. No. 240,916, Mar. 5, 1981, abandoned, which is a continuation of Ser. No. 64,813, Aug. 8, 1979, abandoned.

[51] Int. Cl.³ ............................................. B29C 17/07
[52] U.S. Cl. ................................... 264/521; 264/520; 264/532; 264/535
[58] Field of Search ............... 264/520, 521, 523, 524, 264/525, 528, 529, 530, 532, 535, 537–543; 425/522, 526

[56] References Cited

U.S. PATENT DOCUMENTS 4,385,089 5/1983 Bonnebat et al. ............... 264/537 X

FOREIGN PATENT DOCUMENTS 2389478 12/1978 France .

Primary Examiner—Jan Silbaugh
Attorney, Agent, or Firm—Parkhurst & Oliff

[57] ABSTRACT

This invention relates to a method of fabricating a bottle-shaped container of saturated polyester having superior mechanical strength, very low degrees of age and high temperature deformation, and superior dimensional stability. The piece for forming the bottle-shaped container is heated to an orientation temperature, is biaxially oriented in a blowing mold and is then thermally set by maintaining the outer wall surface of the expanded container in contact with the inner wall surface of the mold, which is kept at a temperature in the range between the glass transition point and the crystallization temperature, for longer than 5 seconds. The blowing mold is formed with the size adjusted in capacity by approx. 6% to allow for shrinkage of the product container when the container is exposed to a high temperature greater than 70° C. and then left to stand, so as to thereby obtain a container of accurate capacity.

11 Claims, 6 Drawing Figures

METHOD OF FABRICATING BOTTLE-SHAPED CONTAINER OF SATURATED POLYESTER

This is a continuation of application Ser. No. 240,916, filed Mar. 5, 1981, now abandoned, which in turn is a continuation of application Ser. No. 064,813, filed Aug. 8, 1979, abandoned.

BACKGROUND OF THE INVENTION

This invention relates to a method of fabricating a bottle-shaped container of saturated polyester and, more particularly, to a method of fabricating a bottle-shaped container which provides superior mechanical strength, very low degrees of age and high temperature deformation, and high dimensional stability.

A transparent thin-walled blow-molded container of biaxially oriented plastic is manufactured by heating a cylindrical piece or parison having a bottom made of saturated polyester such as polyethylene terephthalate to a temperature in the range between the glass transition point and the crystallization temperature of the parison, loading the heated piece into a fully automatic rotary multi-station type blow molding machine via a loading unit, and then laterally and longitudinally biaxially-orienting the piece in the blowing mold. Since the container of saturated polyester thus biaxially oriented has superior transparency, low water and gas permeabilities and is non-toxic, it has a wide range of applications for use as a container in the fields of liquid condiments, soft drinks, alcoholic drinks, etc.

While a container of biaxially oriented saturated polyester is arranged with molecular chains and is formed with microcrystals to improve the mechanical strength and gas permeability resistance, it simultaneously retains remarkable strain in the interior of the wall thereof. When the age strain is exposed to an environmental temperature at or above, for example, approx. 70° C., the strain tends to be released, causing the container to shrink. Such shrinking takes place when the container is cooled upon removal of the molded container from the mold, thereby causing severe problems with the dimensional stability of the container.

SUMMARY OF THE INVENTION

The present invention provides a method of fabricating a bottle-shaped container of saturated polyester, which comprises the steps of loading a cylindrical piece with a bottom heated to blow-molding orientation temperature into a mold (the size of which is adjusted to compensate for the shrinkage of the product container which will occur at the cooling step after the piece is blow-molded and unloaded from the mold) laterally and longitudinally biaxially-orienting the piece in the blowing mold, and then maintaining the outer wall surface of the container body in close contact with the inner wall of the mold, which is retained at a temperature in the range from the glass transition point to the crystallization point, for at least five seconds, thereby thermally setting the dimensional stability of the blow-molded container.

Since the container thus fabricated according to this invention has, as will be described in greater detail, a very small degree of age deformation after being unloaded from the blowing mold at an environmental temperature, and in a high temperature atmosphere, such as about 70° C., as well as superior dimensional stability, there is very little likelihood that the commodity value thereof will be lowered by deformation of the container after blow-molding, so the containers can be delivered to consumers without anxiety.

It is necessary to employ an orientation blowing mold constructed in a size adjusted for the shrinkage naturally occuring due to cooling when the container is unloaded from the blowing mold, because the container thus biaxially oriented and thermally set shrinks considerably in response to the thermal setting temperature and time, and the time at which it is unloaded from the blowing mold, with the result that the capacity varies from the mold shrinkage calculated for the blowing mold.

The greater the shrinkage of the container thus oriented, thermally set, and cooled at its unloading time is, the higher the thermal setting temperature generally is and the shorter the thermal setting time is. More particularly, the shrinkage of the container thermally set for approx. 8 seconds was approx. 4.3% at an environmental temperature of approx. 70° C., 4.6% at approx. 80° C., and approx. 5.3% at approx. 90° C. The orientation blowing mold therefore must be of a size capable of cancelling the shrinkage, which varies in response to the thermal setting time and temperature.

This invention can, therefore, be used to fabricate a bottle-shaped container of a given capacity superior in dimensional stability without large age shrinkage at the environmental temperature merely by determining the size of the blowing mold, considering the thermal setting shrinkage of the blowing mold in terms of the mold shrinkage when blow-molding the container. For example, when a bottle-shaped container of polyethylene terephthalate of 1 liter, 40 g is biaxially blow-molded, the blowing mold capacity should be adjusted by approx. 6%, obtained by adding approx. 2% of thermal setting shrinkage and approx. 4% of the mold shrinkage. Then, when the piece of polyethylene terephthalate is biaxially oriented, it must be retained at a temperature in the range from the glass transition point, approx. 70° C., to the crystallization temperature, approx. 130° C. More specifically, the blowing mold is maintained at 70° to 130° C., preferably 80° to 100° C., and more preferably 85° to 95° C., and the blow-molded container is thermally set in the mold for 5 to 10 seconds before it is unloaded from the mold after it is blow-molded. If it is thermally set for less than 5 seconds, it cannot obtain its dimensional stability, while if it is thermally set for longer than 10 seconds, it is disadvantageous for the molding cycle of the containers.

Accordingly, an object of this invention is to provide a method of fabricating a bottle-shaped container of saturated polyester readily having thin-walled transparency and superior mechanical properties by means of biaxial orientation.

It is another object of this invention to provide a method of fabricating a bottle-shaped container of saturated polyester which incorporates very small deegrees of age deformation and high temperature deformation and high dimensional stability.

It is still another object of this invention to provide a method of fabricating a bottle-shaped container of saturated polyester which employs a biaxial orientation blowing mold of a size determined by taking into consideration both the thermal setting shrinkage of the mold and the mold shrinkage when blow-molding the container.

BRIEF DESCRIPTION OF THE DRAWINGS

The above and other related objects and features of the invention will be apparent from a reading of the following description of the disclosure found in the accompanying drawings and the novelty thereof pointed out in the appended claims.

DETAILED DESCRIPTION OF THE PREFERRED EMBODIMENTS

Figure 1:
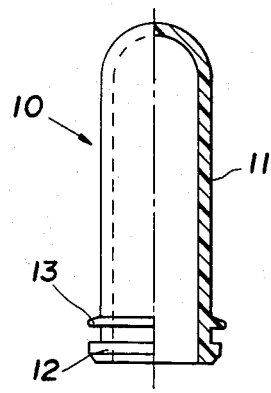
FIG. 1 is a front elevational view with the right half in section of a piece for forming a bottle-shaped container to be used for the method of fabricating the container accoriding to the present invention.

Referring to the drawings, particularly to FIG. 1 showing the piece for forming the bottle-shaped container to be fabricated according to this invention, wherein like reference numerals designate like parts in the following views, the piece 10 is fabricated from saturated polyester such as, for example, polyethylene terephthalate having more than 0.55 intrinsic viscosity, by means of an extruded parison molding process or injection parison molding process. The piece 10 is formed to be cylindrical with a bottom, is relatively thick as a whole, and has an opening formed with neck end portion 12 increased in thickness larger than the body 11 thereof and a flange 13 prefinished at slight interval from the neck and portion 12 in the vicinity of the body 11.

Figure 2:
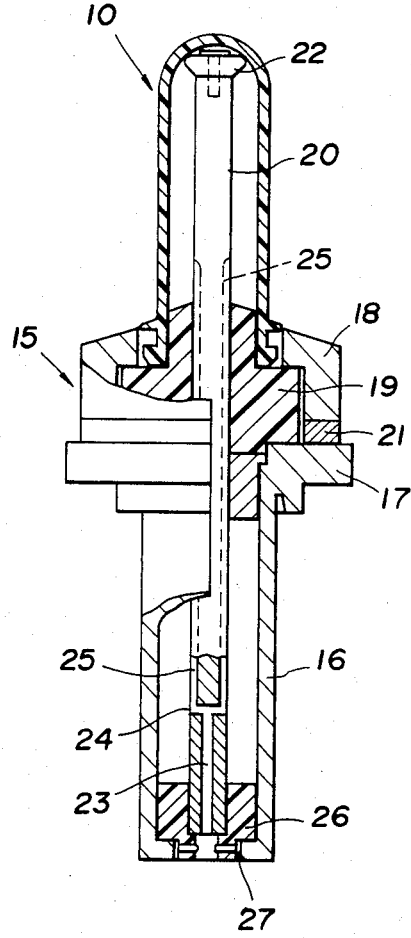
FIG. 2 is a partially fragmentary sectional view of the piece shown in FIG. 1 as attached to a jig used in the method of the present invention.
Figure 3:
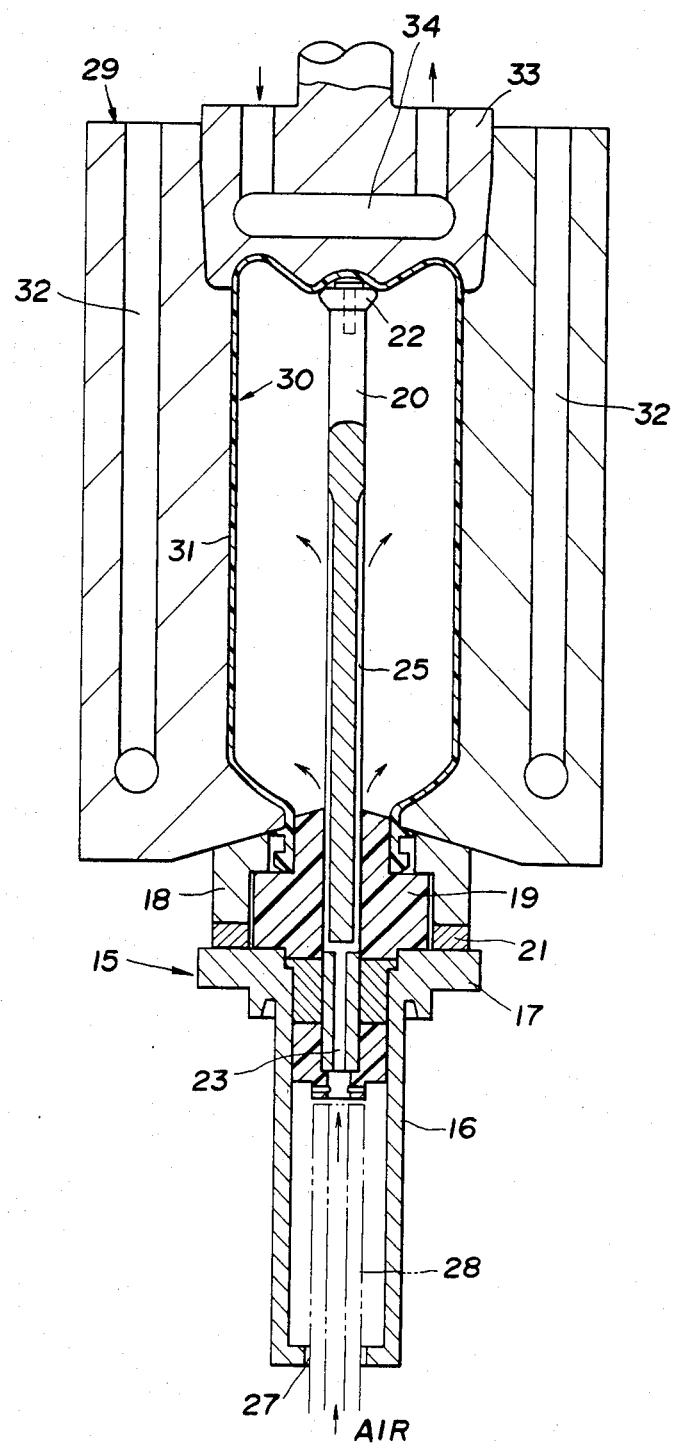
FIG. 3 is a sectional view of the orientation blowing mold in the state when the piece is being biaxially oriented.

FIG. 2 shows the piece 10 attached in inverted state to the jig 15. This jig 15 operates to hold detachably the piece or bottle-shaped container in the steps of heating the piece, loading the piece into the blowing mold of a fully automatic orientation blow molding machine (not shown) with rotary multi-stations, orientation blow-molding the piece, unloading the bottle-shaped container, and removing the product container thus formed. The jig 15 comprises a cylindrical mandrel 16, a circular disk 17 formed integrally at the top of the mandrel 16, a neck end portion support 18 for holding the neck end portion of the piece 10, a core guide 19 of heat and wear resisting synthetic resin such as fluorine resin disposed inside the neck end and portion support 18, and a core shaft 20 elevationally movably inserted into the mandrel 16. The neck portion support 18 operates to support the outer periphery of the neck and portion 12 of the piece 10, and is disposed at the top of the disk 17 through a heat insulating plate 21. The core shaft 20 incorporates a core top 22 of inversely tapered or spherical heat insulating material such as fluorine resin at the top thereof for preventing heat conduction from the piece 10 and adherence of the bottom of the piece 10 thereto when the piece 10 is longitudinally oriented upon extension of the core shaft 20. The core shaft 20 accommodates a T-shaped hole 23 at the bottom thereof with air vent slots 25 of splined shape formed at the upper peripheral surface thereof from the openings 24 of the hold 23, and a nozzle holder 26 at the bottom thereof. As shown in FIG. 3, the mandrel 16 has a hold 27 perforated therein for protruding a cylinder rod 28 therethrough upon longitudinal orientation of the peice within the blow-molding machine (as shown in FIG. 3).

FIG. 3 shows the step wherein the piece 10 is longitudinally oriented, and is then laterally oriented within the mold 29 thereby to blow-mold the piece 10 into a bottle-shaped container 30.

Since the piece 10 will increase in crystal structure if gradually cooled after the molding, thereby lowering its transparency (the so-called bleaching phenomenon), it must be rapidly cooled from the molding temperature to room temperature.

In the present method of fabricating the bottle-shaped container of saturated polyester, the piece 10 of saturated polyester injection-molded is loaded into the mold 29, heated to the orientation temperature for blow-molding the piece 10, and is biaxially oriented, and is further thermally set at the final step of the orientation by contacting the inner wall surface 31 of the mold 29 with the outer wall surface of the container 30 for at least five seconds. It is necessary to heat the piece 10 to within the temperature range between the glass transition point of the saturated polyester, preferably approx. 70° C., and the orientation temperature capable of orienting molecules lower than the melting point thereof, preferably approx. 130° C., and to heat the mold 29 to a similar temperature range for thermally setting the container 30 formed from the piece 10 in case of loading the piece 10 into the blowing mold 29 and of biaxially orienting it in the mold 29.

The bottle-shaped container 30 is formed from the piece 10 by the steps of loading the piece 10 heated to the orientation temperature and supported by the jig 15 into the blowing mold 29, raising the cylinder rod 28 thereby to protrude the core shaft 20 so as to longitudinally orient the piece 10 by stretching it approximately 1.4 to 2.5 times, and introducing compressed air supplied internally from the cylinder rod 28 through the T-shaped hold 23 into the air vent slots 25 and accordingly into the interior of the piece 10 by stretching it to thereby laterally orient the piece 10 approx. twice so as to mold the bottle-shaped container 30 as shown in FIG. 3. The container 30 is thus expanded at the body, bottom and shoulder thereof to allow it to make contact with the inner wall surface 31 of the mold 29 for at least five seconds to thermally set it, and is then unloaded from the mold 29 by opening the mold 29 to take out the container 30.

It is noted that, if the mold 29 is heated to a temperature above the upper limit of the orientation temperature when the container 30 is set, the so-called bleaching phenomenon will occur at the bottom or the like of the container 30, producing a state with nearly no orientation, while if the mold 29 is not heated to the glass transition point of the saturated polyester, the container 30 cannot be thermally set to remove its strain. It is also noted that, if the container 30 is not kept in contact with the inner wall surface of the mold 29 for at least five seconds, it cannot be released sufficiently from its strain.

The mold 29 also has passages 32 perforated therein for passing a heating medium (liquid) therethrough to maintain the predetermined thermal setting temperature.

The container 30, if sufficiently oriented and thermally set for longer than five seconds, can be unloaded from the mold 29 while retaining its high temperature shape without deformation, and then cooled as it is. However, any portions not sufficiently oriented such as, for example, the bottom of the container 30, will deform. In order to prevent creation of such insufficiently set portions of the container 30 in the thermal setting step, a passage 34 is perforated at the bottom bush 33 as shown in FIG. 3 to pass a cooling medium separately from the passages 32. More specifically, only the bottom bush 33 is cooled upon unloading of the container 30 from the mold 29 thereby to prevent the partial deformation of the container 30 by means of hardening it upon cooling thereof.

EXAMPLE

A cylindrical piece of polyehtylene terephthalate with a bottom was molded by an injection parison process. After this piece was heated to an orientation temperature of 95° C., it was loaded into a blowing mold 255 mm high and 1 liter in capacity heated to an 86° C. thermal setting temperature. The piece was biaxially oriented by protruding the core shaft and blowing compressed air into the mold to thus obtain a thin-walled transparent bottle-shaped container. Three types of the containers were molded by thermally setting them for 6, 8 and 10 seconds, respectively.

The thermal setting time when the outer wall surface of the piece is kept in contact with the inner wall surface of the mold is regarded as substantially the same as the blowing time in this method of fabricating the bottle-shaped container.

Figure 4:
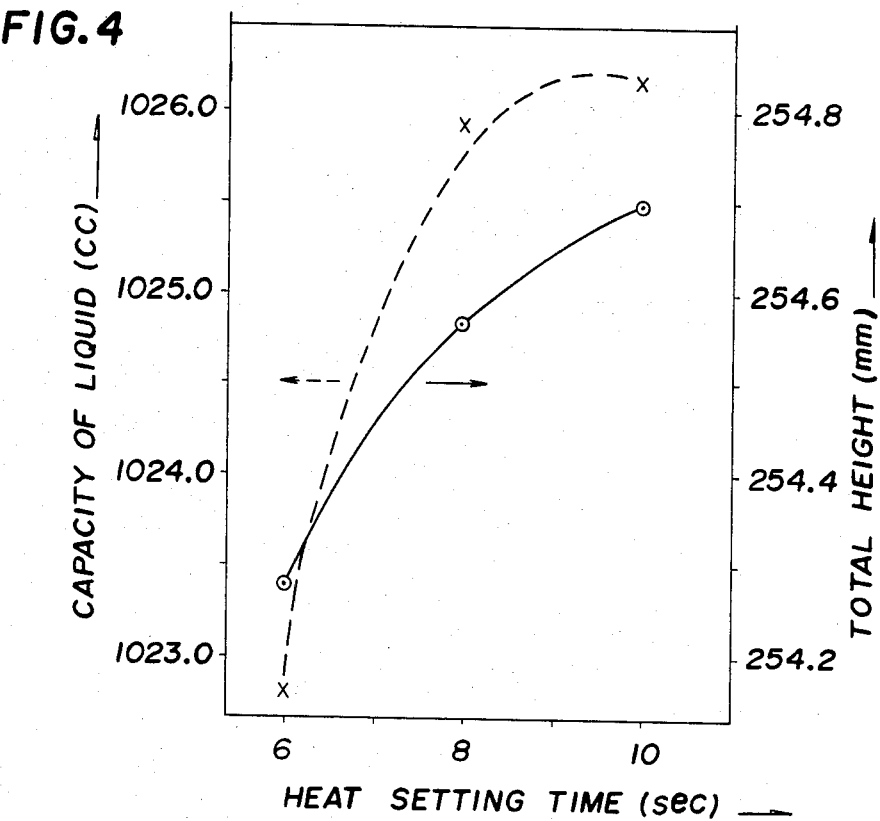
FIG. 4 is a graphical representation of the relationship among the total height and the capacity (overflow capacity), and the thermal setting time of a 1 liter container 30 minutes after the biaxial-orientation blow molding.

The total heights and capacities after the 30 minutes of the containers thus obtained are shown in the graph shown in FIG. 4.

When the thermal setting time is increased from 6 seconds to 10 seconds, both the total height and capacity of the container are increased as seen from the graph.

Figure 5:
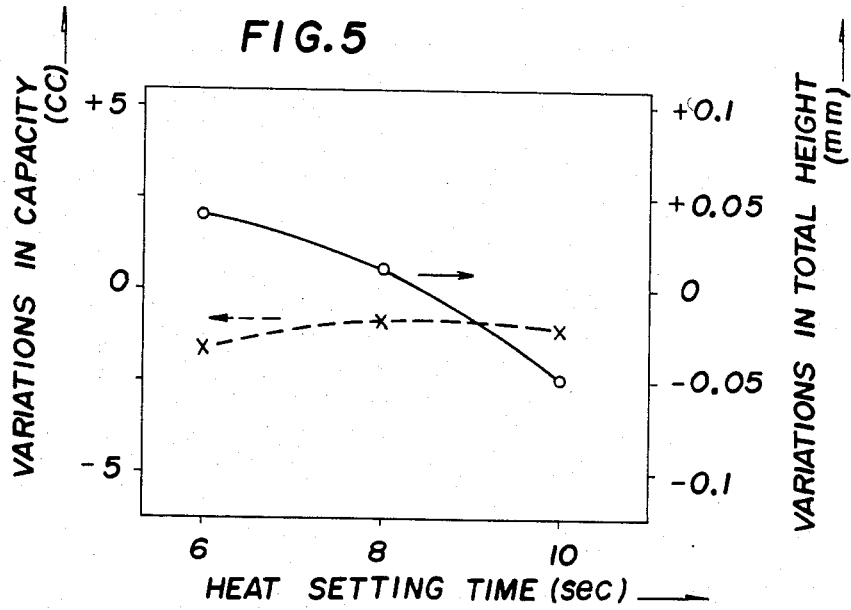
FIG. 5 is a graph of the relationship among the total height and the capacity, and the thermal setting time of the 1 liter container filled with high temperature water.

Comparisons of the total heights and capacities of the containers of the above three types are shown in FIG. 5 measured after the containers were left to stand for at room temperature for two hours after having been filled with hot water at 70° C. 30 minutes after the blowing molding process and measured before the hot water was added.

Figure 6:
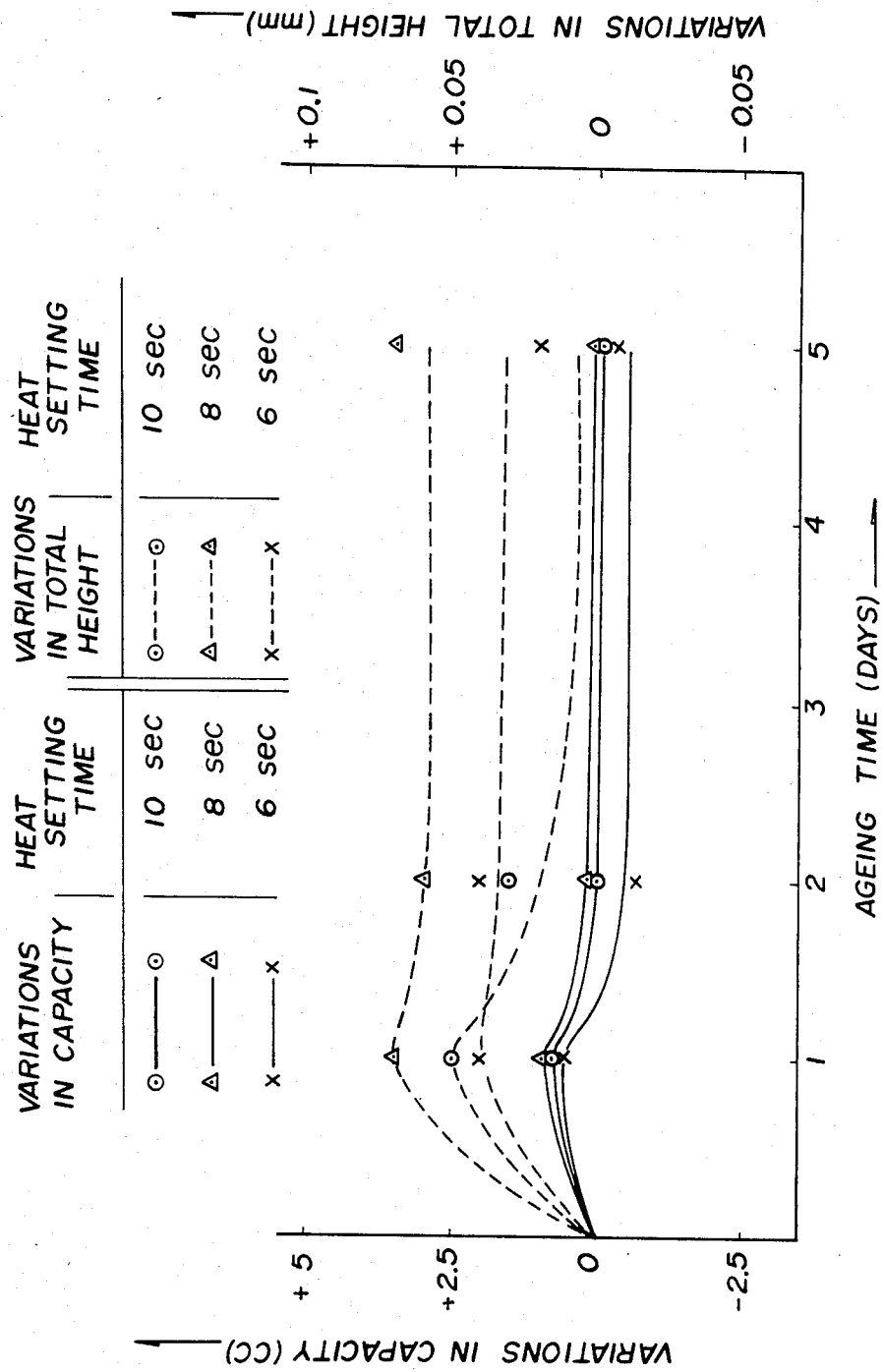
FIG. 6 is a graph of the relationship among the total height and the capacity, and the thermal setting time of the container left to stand in an atmosphere at 40° C., with 75% relative humidity.

The total heights and capacities of the containers of above three containers are shown in FIG. 6 in respect of the difference between those left to stand for in an oven at 40° C., with 75% relative humidity for 1 to 5 days, beginning 30 minutes after the blow-molding process and those measured before the containers were left to stand in the oven.

It is readily understood from FIG. 5 that the bottle-shaped container of saturated polyester thus obtained according to the method of the present invention has superior properties of high temperature dimensional stability capable of enduring filling with high temperature liquid at 70° C., and it is also easily appreciated from FIG. 6 that the container thus obtained according to the present invention has very small age deformation, as well as superior dimensional stability.

What is claimed is:

1. A method of fabricating a bottle-shaped container of saturated polyester from a preformed cylindrical piece of polyethylene terephthalate with a bottom, comprising:

heating the piece to a temperature for orienting, loading the heated piece into the blowing mold which is heated at a temperature in the range between the glass transition temperature and the orientation temperature of the saturated polyester, biaxially orienting the piece by longitudinally orienting the piece and then laterally orienting it by introducing compressed air into the interior of the piece while said piece is contained in the mold until the outer wall of the piece comes into contact with the inner wall of the mold;

the container expanded by said biaxially orienting step being thermally set by said contact with the outer wall of the container with the inner wall of the mold retained at a temperature in the range between substantially the glass transition temperature and the orientation temperature for a period of time in the range of six to eight seconds;

opening the mold to unload and rapidly cool the container thus molded;

said mold having a capacity upwardly adjusted by about 6% relative to the desired final capacity of said container, said blowing mold temperature being in the range of about 70° C. to less than about 80° C.

2. The method according to claim 1, wherein the biaxial orientation is performed by means of a jig having a cylindrical mandrel, a circular disk formed integrally with the mandrel, a neck end portion support for holding the neck end portion of the piece, a core guide disposed inside the support, and a core shaft elevationally movably inserted into the mandrel.

3. The method according to claim 2, wherein the temperature at which said blowing mold is retained is about 70° C.

4. The method according to claim 2, wherein the piece is longitudinally oriented approximately 1.4 to 2.5 times its length.

5. The method according to claim 2, wherein said jig longitudinally orients the preformed piece 1.4 to 2.5 times within the blow molding machine by raising a rod to protrude the core shaft, and said jig laterally orients the preformed piece by introducing compressed air from said rod through an air vent slot in the rod into the interior of the preformed piece.

6. The method according to claim 1, wherein the temperature at which said blowing mold is retained is about 70° C.

7. The method of fabricating a bottle-shaped container as claimed in claim 1, wherein the piece is longitudinally oriented to approximately 1.4 to 2.5 times its length.

8. A method of fabricating a bottle-shaped container from a preformed cylindrical piece of polyethylene terephthalate with a bottom, comprising:

selecting a preformed piece with an intrinsic viscosity of more than 0.55, heating the piece to a temperature for orienting, loading the heated piece into the blowing mold which is heated at a temperature in the range between the glass transition temperature and the orientation temperature of the saturated polyester, biaxially orienting the piece by longitudinally orienting the piece and then laterally orienting it by introducing compressed air into the interior of the piece while said piece is contained in the mold until the outer wall of the piece comes into contact with the inner wall of the mold;

the container expanded by said biaxially orienting step being thermally set by contact with the outer wall of the container with the inner wall of the mold retained at a temperature in the range between the glass transition temperature and the orientation temperature for a period of time in the range of six to eight seconds, opening the mold to unload and rapidly cool the container thus molded, said mold having a capacity upwardly adjusted by about 6% relative to the desired final capacity of said container, said blowing mold temperature being in the range of about 70° C. to less than about 80° C.

9. The method of fabricating a bottle-shaped container as claimed in claim 8, wherein the piece is longitudinally oriented approximately 1.4 to 2.5 times its length.

10. The method according to claim 8, wherein the temperature at which said blowing mold is retained is about 70° C.

11. The method according to claim 8, further comprising the step of cooling a bottom bush of the mold when thermally setting the container.

* * * * *